3,101,337
1,4-DIALKYL-1,4-DIAZONIABICYCLO [2.2.2] OCTANE DI (DISILICATE)
George T. Kerr, Cherry Hill Township, Camden County, N.J., assignor to Socony Mobil Oil Company, Inc., a corporation of New York
No Drawing. Filed June 29, 1962, Ser. No. 206,187
7 Claims. (Cl. 260—268)

This invention relates to a new crystalline dibasic quaternary ammonium silicate and method for synthesizing the same. More particularly, the present invention is directed to a 1,4-dialkyl-1,4-diazoniabicyclo [2.2.2] octane di (disilicate) and with the preparation thereof.

The compositions of this invention may be characterized by the general formula:

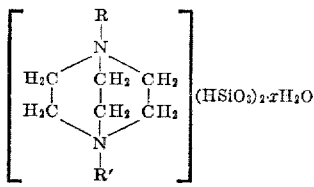

where R and R' are alkyl radicals having from 1 to 5 carbon atoms and $x$ is a number from 0 to 4.

In one embodiment, the invention is directed to 1,4-dimethyl-1,4-diazoniabicyclo [2.2.2] octane di (disilicate) and the preparation thereof. The latter compound is useful in the synthesis of zeolites, such as zeolite ZK–5 described in my copending application Serial No. 174,817, filed February 21, 1962, of which this application is a continuation-in-part.

The basic starting material in synthesis of the compositions of this invention is 1,4-diazabicyclo [2.2.2] octane. This compound, otherwise known as triethylenediamine, is readily available.

Utilizing such starting material, the same is converted into a 1,4-dialkyl-1,4-diazoniabicyclo [2.2.2] octane dihydroxide. The above dihydroxide may be prepared by any suitable manner. Generally, it is prepared by complete alkylation of 1,4-diazabicyclo [2.2.2] octane with an alkyl iodide to yield 1,4-dialkyl-1,4-diazoniabicyclo [2.2.2] octane diiodide, which upon subsequent reaction with silver hydroxide is converted to the dihydroxide. Another method consists in alkylating the diamine with dialkyl sulfates to yield the dibasic quaternary ammonium sulfate which can then be converted to the dihydroxide by reaction with barium hydroxide. The alkyl groups in the above compounds contain from 1 to 5 carbon atoms, with particular preference being accorded those compounds wherein the alkyl group is methyl.

The 1,4-dialkyl-1,4-diazoniabicyclo [2.2.2] octane di (disilicate) is suitably prepared by dissolving silica in a solution and usually an aqueous solution of the above 1,4-dialkyl-1,4-diazoniabicyclo [2.2.2] octane dihydroxide. The source of silica is preferably silica gel. Other sources include, for example, hydrosols of silica, silicate esters, silica aerogels and freshly prepared, low molecular weight silicic acids.

The temperature for effecting dissolution of silica in the 1,4-dialkyl-1,4-diazoniabicyclo [2.2.2] octane dihydroxide should not exceed about 100° C. Generally such temperature is between about 0° C. to about 100° C. and preferably in the approximate range of 80° C. to 100° C. Temperatures in excess of about 100° C. should be avoided since at such temperatures decomposition of the quaternary base is encountered.

The concentration of the 1,4-dialkyl-1,4-diazoniabicyclo [2.2.2] octane dihydroxide solution employed for dissolving the silica may vary over a wide range but preferably such concentration is at least 1 molar to effect ready dissolution of the silica. The latter is preferably combined with the dihydroxide in an approximately equimolar ratio. The ratio of silica to the dihydroxide compound may, however, be between about 3:1 and 0.5 to 1.

The product which crystallizes out upon maintaining the aforesaid solution in a quiescent state is a 1,4-dialkyl-1,4-diazoniabicyclo [2.2.2] octane di (disilicate). Such crystalline product is of the hexagonal form. Upon removal from the mother liquor and drying, the resulting product is a mass of white opaque crystals.

As indicated hereinabove, the 1,4-dialkyl-1,4-diazoniabicyclo [2.2.2] octane dihydroxide is suitably prepared by reaction initially of 1,4-diazabicyclo [2.2.2] octane with an alkyl iodide, the alkyl group of which contains from 1 to 5 carbon atoms. Such reaction is suitably carried out at a temperature within the approximate range of 0 to 100° C. employing a molar ratio of alkyl iodide to 1,4-diazabicyclo [2.2.2] octane of between 3:1 and 2:1. Reaction is carried out for a period of time dependent on the temperature and composition of the reaction mixture, generally between about ½ and about 10 hours to yield 1,4-dialkyl-1,4-diazoniabicyclo [2.2.2] octane diiodide.

The latter is then reacted with silver hydroxide in aqueous medium at a temperature of between about 0° and about 100° C. to yield a resulting precipitate of silver iodide. The latter is removed from the resulting solution, generally by filtration or centrifuging to give a colorless filtrate of 1,4-dialkyl-1,4-diazoniabicyclo [2.2.2] octane dihydroxide.

Another method for preparing the 1,4-dialkyl-1,4-diazoniabicyclo [2.2.2] octane dihydroxide involves slowly adding to triethylenediamine dissolved in methanol and maintained at about 0° C., a dialkyl sulfate, such as dimethyl sulfate. The resulting mixture is thereafter warmed to room temperature and refluxed over an extended period of time, generally between about 10 and about 20 hours. At the end of such time, the mixture is essentially neutral. Ammonium carbonate is thereafter added to raise the pH of the mixture to within the approximate range of 8 to 9. The resulting mixture is then refluxed. The methanol is evaporated off, replaced with water and the mixture again refluxed over an extended period of time. Barium hydroxide is added to the resulting mixture which is again refluxed. The mixture is thereafter cooled and insoluble barium sulfate is filtered therefrom. The filtrate of 1,4-dialkyl-1,4-diazoniabicyclo [2.2.2] octane dihydroxide may, if desired, be concentrated by evaporation.

The following examples will serve to illustrate the composition and method of the present invention without limiting the same:

*Example 1*

Methyl iodide in the amount of 410 grams (2.88 moles) was placed in a 1 liter three-neck, round bottom flask fitted with a stirrer, reflux condenser and drop funnel. The flask was immersed in ice water and there was added over a one hour period, through the funnel, a solution of 148.4 grams (1.32 moles) of 1,4-diazabicyclo [2.2.2] octane dissolved in 400 milliliters of absolute alcohol. A solid product separated from the reaction mixture during the reaction. The mixture was then stirred for 0.5 hour at room temperature of approximately 27° C. Thereafter, 10 additional grams of methyl iodide were introduced into the mixture and the latter was stirred at reflux temperature of approximately 78° C. on a steam bath for 0.5 hour. Excess methyl iodide and alcohol were then evaporated from the flask. The residual solid product was collected on a Buckner funnel and washed with absolute ethanol. After recrystallization from a water-ethanol mixture and air-drying, a sample of the crystalline product was analyzed and found to be 1,4-dimethyl-1,4-diazoniabicyclo [2.2.2] octane diiodide, characterized by the formula:

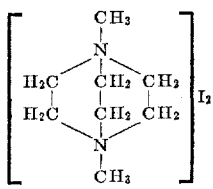

The above compound was next converted to the dihydroxide as shown in the following example:

Example 2

Silver hydroxide was prepared by reacting a solution of 200 grams of silver nitrate dissolved in 500 ml. of water with a solution of 50 grams of sodium hydroxide dissolved in 300 ml. of water. A precipitate of silver hydroxide formed and was collected on a funnel and washed with water to remove excess sodium hydroxide. The moist silver hydroxide, 200 ml. of water and 191 grams of 1,4-dimethyl-1,4-diazoniabicyclo [2.2.2] octane diiodide, prepared as in Example 1, were placed in a 1 liter ball mill and rotated for 3 hours.

The resulting reaction mixture was filtered through a sintered disc filter funnel and the residue in the funnel was washed with about 200 ml. of water. The colorless filtrate was found by filtration to be approximately 2 N solution as a base. The solution was evaporated under vacuum to increase the concentration. When the volume was reduced sufficiently to yield about a 3 N solution, the mixture was filtered through a sintered filter funnel. The resulting clear, colorless filtrate was a solution of 1,4 - dimethyl - 1,4 - diazoniabicyclo [2.2.2] octane dihydroxide.

A solution containing silicate and 1,4-dimethyl-1,4-diazoniabicyclo [2.2.2] octane ions was prepared by dissolving silica gel in the above dihydroxide solution in accordance with the following equation:

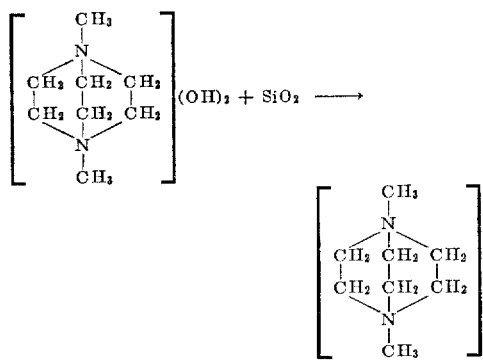

Such was accomplished in accordance with the following example:

Example 3

Silica gel in the amount of 9.2 grams was dissolved with gentle heating in 102 ml. of 2.99 N solution of 1,4-dimethyl - 1,4 - diazoniabicyclo [2.2.2] octane dihydroxide, prepared as in Example 2. The resulting solution was permitted to stand at ambient temperature for a period of several weeks, at which time large transparent, hexagonal crystals were observed. Upon removal from the mother liquor and drying in air, the crystals became whitish and opaque.

The crystalline product obtained was subjected to chemical analysis. Analytical results are set forth below including the calculated analyses of 1,4-dimethyl-1,4-diazoniabicyclo [2.2.2] octane di (disilicate) tetrahydrate:

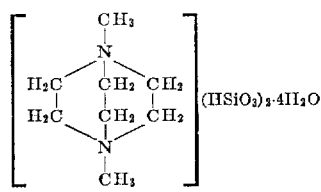

|   | Found | Calculated |
|---|---|---|
| C | 25.78 | 26.1 |
| H | 7.57 | 7.6 |
| N | 7.26 | 7.6 |
| SiO$_3$ | 41.10 | 41.3 |
| O | 18.29 | 17.4 |

An X-ray diffraction powder pattern of the above crystalline solid was obtained utilizing standard techniques. The radiation was the K$\alpha$ doublet of copper and a Geiger counter spectrometer with a strip chart pen recorder was used. The peak heights, I, and the positions as a function of $2\theta$, where $\theta$ is the Bragg angle, were read from the spectrometer chart. From there, the relative intensities, $$\frac{100 I}{I_0}$$

where $I_0$ is the intensity of the strongest line or peak and $d$ (obs.), the interplanar spacing in A., corresponding to the recorded lines were calculated. An X-ray diffraction powder photograph indicated the following interatomic distances, $d$, in A. and relative intensities:

| $d$, A. | I/I$_0$×100 | $d$, A. | I/I$_0$×100 |
|---|---|---|---|
| 11.0 | 100 | 2.82 | 30 |
| 8.7 | 60 | 2.70 | 30 |
| 6.1 | 30 | 2.57 | 10 |
| 5.4 | 20 | 2.35 | 10 |
| 4.2 | 30 | 2.20 | 5 |
| 4.0 | 30 | 2.14 | 10 |
| 3.7 | 100 | 2.08 | 5 |
| 3.45 | 30 | 2.01 | 10 |
| 3.35 | 5 | 1.97 | 5 |
| 3.13 | 40 | 1.92 | 10 |
| 2.91 | 20 | | |

It will be understood that the above description is merely illustrative of preferred embodiments of the invention of which many variations may be made within the scope of the following claims by those skilled in the art without departing from the spirit thereof.

I claim:

1. 1,4-dialkyl-1,4-diazoniabicyclo [2.2.2] octane di (disilicate) having alkyl groups of 1 to 5 carbon atoms.

2. A composition characterized by the formula:

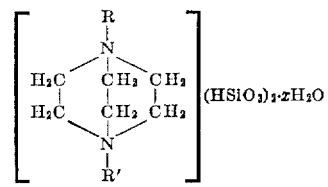

where R and R' are alkyl radicals having from 1 to 5 carbon atoms and $x$ is a number from 0 to 4.

3. 1,4-dimethyl-1,4-diazoniabicyclo [2.2.2] octane di (disilicate).

4. A composition characterized by the formula:

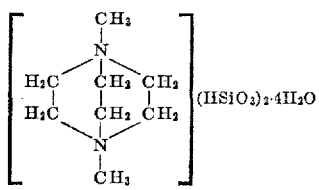

5. The method for synthesizing 1,4-dialkyl-1,4-diazoniabicyclo [2.2.2] octane di (disilicate) having alkyl groups of 1 to 5 carbon atoms, which comprises reacting in aqueous medium 1,4-dialkyl-1,4-diazoniabicyclo [2.2.2] octane dihydroxide, having alkyl groups of 1 to 5 carbon atoms, with silica at a temperature not exceeding about 100° C. and recovering the product which crystallizes.

6. The method for synthesizing a 1,4-dimethyl-1,4-diazoniabicyclo [2.2.2] octane di (disilicate) which comprises reacting in aqueous medium 1,4-dimethyl-1,4-diazoniabicyclo [2.2.2] octane dihydroxide with silica at a temperature of between about 0° C. and about 100° C. and recovering the resulting crystalline product.

7. The method for synthesizing a composition characterized by the formula:

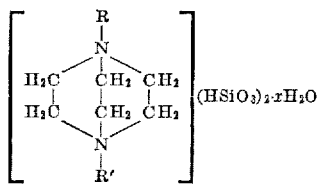

where R and R' are alkyl radicals having from 1 to 5 carbon atoms and $x$ is a number from 0 to 4, which comprises dissolving silica in an aqueous solution of a 1,4-dialkyl-1,4-diazoniabicyclo [2.2.2] octane dihydroxide, the alkyl groups of which contain from 1 to 5 carbon atoms, maintained at a temperature between about 0° C. and about 100° C. and recovering the resulting crystalline product.

No references cited.

UNITED STATES PATENT OFFICE
CERTIFICATE OF CORRECTION

Patent No. 3,101,337                                    August 20, 1963

George T. Kerr

It is hereby certified that error appears in the above numbered patent requiring correction and that the said Letters Patent should read as corrected below.

Column 1, line 34, for "Serial No. 174,817" read -- Serial No. 174,718 --.

Signed and sealed this 21st day of April 1964.

(SEAL)
Attest:

ERNEST W. SWIDER
Attesting Officer

EDWARD J. BRENNER
Commissioner of Patents